United States Patent [19]

Moritoki et al.

[11] 4,448,747
[45] May 15, 1984

[54] HIGH DENSITY SINTERING METHOD FOR POWDER MOLDED PRODUCTS

[75] Inventors: Masato Moritoki, Miki; Takao Fujikawa; Junichi Miyanaga, both of Kobe, all of Japan

[73] Assignee: Kabushiki Kaisha Kobe Seiko Sho, Kobe, Japan

[21] Appl. No.: 413,836

[22] Filed: Sep. 1, 1982

[30] Foreign Application Priority Data

Sep. 1, 1981 [JP] Japan .................. 56-138012

[51] Int. Cl.³ .................. B22F 3/14; B22F 3/16
[52] U.S. Cl. .................. 419/49; 419/54; 419/55
[58] Field of Search .................. 419/49, 54, 55

[56] References Cited

U.S. PATENT DOCUMENTS

| | | | |
|---|---|---|---|
| 3,622,313 | 11/1971 | Havel | 419/49 |
| 3,772,009 | 11/1973 | Isaksson | 419/49 |
| 3,893,852 | 7/1975 | Bergman et al. | 419/49 |
| 4,032,337 | 6/1977 | Boyer | 419/49 |
| 4,359,336 | 11/1982 | Bowles | 419/49 |

*Primary Examiner*—Brooks H. Hunt
*Attorney, Agent, or Firm*—Oblon, Fisher, Spivak, McClelland & Maier

[57] ABSTRACT

A high density sintering method for powder molded products by applying preliminary sintering to powder molded products previously molded into a predetermined shape and then applying hot isostatic press process to the sintered products thereby producing high density sintered product which includes the steps of loading the powder molded products into a movable heating furnace equipped with at least one heating means and having a heat insulating structure, introducing the heating furnace into an atmosphere chamber, applying preliminary sintering to the powder molded products in the heating furnace by the heating means while conditioning the inside of the atmosphere chamber to a vacuum or predetermined gas atmosphere, subsequently removing the heating furnace while maintaining the inside thereof at a high temperature from the atmosphere chamber and directly introducing the furnace into a high pressure vessel, thereafter, applying the hot isostatic press process to the sintered products in the furnace while charging a gas as a pressure medium under pressure into the high pressure vessel and elevating the temperature in the heating furnace by the heating means, thereby producing high density sintered products, and then removing the heating furnace together with the high density sintered products loaded therein out of the high pressure vessel after completion of the hot isostatic press process.

10 Claims, 4 Drawing Figures

HIGH DENSITY SINTERING METHOD FOR POWDER MOLDED PRODUCTS

BACKGROUND OF THE INVENTION

1. FIELD OF THE INVENTION

This invention relates to so-called hot isostatic pressing process (hereinafter referred to as HIP process) in which powder molded products of ceramic or metal are sintered or densified under a gas atmosphere of high temperature and high pressure.

2. DESCRIPTION OF THE PRIOR ART

The HIP process has attracted increasing attention in recent years in various fields of art as an excellent technique for producing sintered products of high density from powdered ceramics, powdered metals or a mixture thereof, eliminating residual pores in cemented carbides under collapse or forming diffusion bonds between metal materials by the isotropic compression of bodies to be processed at high temperature using an inert gas as a pressurizing medium. Since the HIP process is applied under a gas atmosphere at high temperature and high pressure, it has to be carried out using an expensive HIP apparatus equipped with special structures and over a long cycle time period for operation including the steps of temperature elevation, pressure increase, temperature lowering and pressure decrease. Thus, an important technical problem at the present time is to shorten the cycle time period in order to improve the productivity of the HIP process. For solving the above problem, an attempt has been proposed for the effective utilization of the HIP apparatus in view of its operation time by carrying out the time-consuming heating step of temperature elevation in a preheating furnace and, subsequently, carrying out the pressure increase step solely or in combination with only a slight temperature elevation in the HIP apparatus. Although this proposed method can be applied advantageously for those materials, for example, powdered metals encapsulated in steel capsules or cast materials having casting defects that require no particular consideration of the preheating atmosphere by using a preheating furnace of a relatively simple structure, such a simple preheating furnace can not be used for the process requiring vacuum or like other particular atmospheres, for instance, in the preliminary sintering of molded products of ceramic or metal powder, followed by a further densifying step in the HIP process. The method of applying the preliminary sintering and the subsequent HIP process to the powder molded products is an important process for producing cemented carbide tools, ceramic tools, ferrite materials and the likes. However, since the preliminary sintering is usually carried out in a preheating furnace of a complicated structure exclusively designed therefor and the sintered products are charged into the HIP apparatus after being cooled once near the room temperature, it results in a great loss in heat energy. In addition, preheating of the sintered products in the HIP apparatus brings about the increase in the time occupying the HIP apparatus, that is, the cycle time for the HIP process.

In order to avoid the heat energy loss in the HIP process, Japanese Patent Laid-Open No. 25061/1972 proposes a furnace for vacuum sintering and pressurization, which applies both the vacuum sintering and the HIP process in one apparatus. However, the powder molded products have to first be sintered under vacuum into presintering products in the HIP apparatus according to this proposed technique. As is well known there is a great time difference for elevating the temperature to a required level for the preliminary sintering between a pressurized state and an atmospheric or reduced pressure state and that a much longer time period is necessary under the atmospheric or reduced pressure state than under the pressurized state. For instance, argon gas at high pressure of 1000 kg/cm$^2$ has a viscosity only 1.1–3 times as great as that of argon gas under atmospheric pressure although its density is several hundreds times as high as the latter. Therefore, violent convection occurs to remarkably increase the rate of the heat transfer through convection, whereby the heat transfer rate from the furnace atmosphere to the material to be sintered is significantly increased. Accordingly, if the preliminary sintering that has to be carried out under vacuum or inert gas, at most, at the atmospheric pressure is applied in the HIP apparatus, it would increase the time for temperature elevation due to the reduction in the heat transfer rate and further require additional time for exhaustion and replacement of furnace gas, which remarkably worsens the working efficiency of the relatively expensive HIP apparatus and leads to an increase in the cost of the products. Since the size of the HIP apparatus main body has been scaled-up and thus the HIP cycle time has been further increased due to the recent increasing trend in the products, various counter measures for decreasing the cycle time are taken for the improvement in the HIP apparatus, such as the use of a compressor with improved efficiency and increased capacity, improvement in a heating device and the like. However, the improvement in the apparatus per se has a certain limit due to the increased cost.

SUMMARY OF THE INVENTION

This invention has been accomplished as the result of an earnest study for overcoming the foregoing various problems involved in the prior art. Accordingly, the object of this invention, concerning the preliminary sintering and the subsequent HIP process for molded products of powdered ceramics or metals, is to shorten the HIP cycle time significantly and improve the working efficiency for the expensive HIP apparatus to thereby providing a remarkable improvement in the productivity, by the combined use of specific apparatus and skillfully combining the specific steps of such apparatus.

Referring more specifically to the first invention attained by the present inventors, it provides a method of high density sintering for powder molded products by applying preliminary sintering to powder molded products previously molded into a predetermined shape and then applying a hot isostatic press process to the sintered products thereby producing high density sintered products, which comprises loading the powder molded products into a movable heating furnace equipped with a heating device and having a heat insulating structure, introducing the heating furnace into an atmosphere chamber, applying preliminary sintering to the powder molded products in said heating furnace by the heating device while conditioning the inside of the atmosphere chamber to a vacuum or predetermined gas atmosphere, subsequently taking out the heating furnace while maintaining the inside of the furnace at a high temperature from the atmosphere chamber and directly introducing the furnace into a high pressure vessel, thereafter, applying hot isostatic press process to the preliminary sintered products in the furnace while charging a gas as a pressure medium under pressure into the high pressure vessel and elevating the temperature in the heating furnace by the heating device thereby producing high density sintered products, and then taking out the heating furnace together with the sintered products loaded therein out of the high pressure vessel after the completion of the hot isostatic press process.

Referring then to the second embodiment of the invention, such provides a method of high density sintering for powder molded products by applying preliminary sintering to powder molded products previously molded into a predetermined shape and then applying a hot isostatic press process to the sintered products thereby producing high density sintered products, which uses a plurality of movable heating furnaces each equipped with a heating device and having a heat insulating structure and one or more atmosphere chambers and a high pressure chamber, and which repeats the successive steps of loading the powder molded products into the first heating furnace, introducing the heating furnace into the atmosphere chamber, applying preliminary sintering to the powder molding products in the first heating furnace by the heating device while conditioning the inside of the atmosphere chamber to a vacuum or predetermined gas atmosphere, subsequently taking out the heating furnace while maintaining the inside of the furnace at a high temperature from the atmosphere chamber and directly introducing the furnace into the high pressure vessel, thereafter, applying hot isostatic press process to the sintered products in the heating furnace while charging a gas as a pressure medium under pressure into the high pressure vessel and elevating the temperature in the heating furnace by the heating device, while on the other hand, introducing a second heating furnace loaded with the powder molded products into the atmosphere chamber and applying the preliminary sintering to the powder molded products in the same manner as above in the course of the hot isostatic press process and introducing the second heating furnace while maintaining the inside of the furnace at a high temperature into the high pressure vessel from which the first heating furnace has been taken out after the completion of the hot isostatic press process.

Preferred molded products usable in the method of this invention include, but not exclusively, those molded products comprising powdered ceramics, powdered metals or mixtures of them molded into predetermined shapes. Such molded products can be prepared by any optional known means, for instance, injection molding, rubber pressing, extrusion molding, hot pressing and hydrostatic pressing, and they have a relative density of about 60–95% relative to the theoretical density of the material concerned. In the case of using molding aids such as organic binders upon molding, it is desired to previously apply a heat treatment at a temperature below about 1000° C. to remove them through decomposition, evaporation or the like. Further, it may some times be necessary to apply machining or like other treatment to molded products for properly adjusting the shape or the accuracy thereof.

The molded products thus prepared are loaded in a movable heating furnace incorporating heating means such as of electrical heaters and having outer circumferential walls made of heat insulating structures.

BRIEF DESCRIPTION OF THE DRAWINGS

These and other objects, as well as the features of this invention will now be explained more in detail by way of preferred embodiments referring to the accompanying drawings, wherein.

DETAILED DESCRIPTION OF THE PREFERRED EMBODIMENTS

A preferred embodiment of a heating furnace suitable for use in the method of this invention will be explained first.

Figure 1:
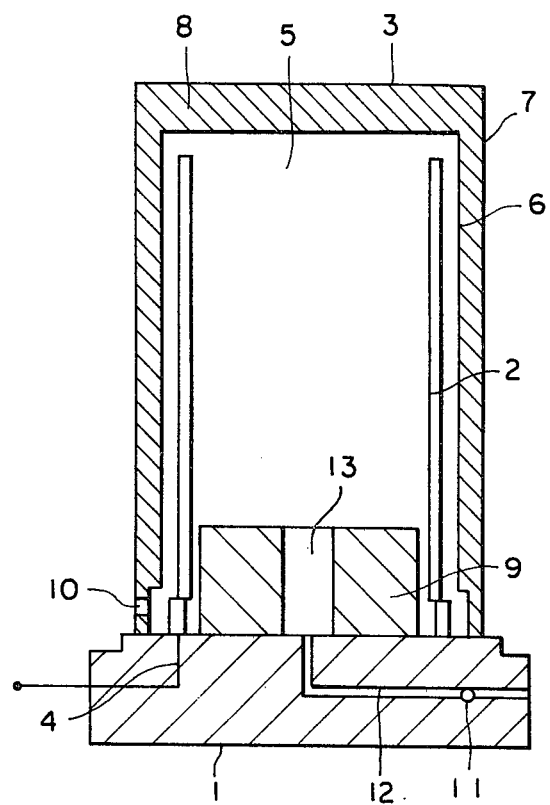
FIG. 1 is a schematic cross sectional view of one embodiment of the heating furnace to be used in the method of this invention.

In FIG. 1, heating elements 2 comprising electrical heating plates are provided on a lower plug 1 while being electrically insulated in a heat insulating structure 3. Electrical power is supplied to the heating elements 2 through an electrode 4 hermetically disposed in the lower plug 1 and in an electrically insulated state. The heat insulating structure 3 surrounding a process chamber 5 including the heating elements 2 comprises inverted-type cups 6 and 7 coaxially arranged to each other and fiberous heat insulator 8 such as ceramic fibers filled between them, and the structure 3 is detachably mounted to the lower plug 1. The upper surface of the lower plug 1 is covered with a heat insulating material 9. The inside and the outside of the process chamber 5 are communicated by way of a through hole 10 perforated in a part of the heat-insulating structure 3, and the inside of the process chamber 5 can be fed with atmosphere gas such as an inert gas through a conduit 12 disposed in the lower plug 1 and by way of an opening 13 formed in the heat insulating material 9. Reference 11 represents an ON-OFF valve for the conduit 12.

In the heating furnace having the foregoing constitution, the heat insulating structure 3 is raised upwardly from the lower plug 1 to open the inside of the process chamber 5 and molded products are arranged by way of the heat insulating material 9 on the lower plug 1. Thereafter, the heat insulating material 3 is mounted on the lower plug 1 to close the process chamber 5, whereby the apparatus is set for the operation. It will be apparent that the number of the molded products to be loaded in the heating furnace can be selected optionally depending on the size thereof and the volume of the heating furnace for improving the working efficiency. In the situation where a plurality of molded products are loaded simultaneously, they are arranged so as to be spaced apart from each other so that the molded products do not contact each other and become laminated by way of trays 16 made of heat insulating material such as graphite, boron nitride, molybdenum, platinum and silicon carbide.

The heating furnace loaded with the molded products are then placed into an atmosphere chamber. Then the atmosphere in the chamber is set to a predetermined condition and preliminary sintering is applied to the molded products in the heating furnace by the heating elements 2. The sintering step is further explained specifically referring to FIG. 2, which shows a schematic vertical cross sectional view of the heating furnace as placed into the atmosphere chamber. In this figure, a cylindrical atmosphere chamber 14 opened at the bottom is hermetically engageable at its lower end with the lower plug 1 of the heating furnace and provided at its top with a gas exhaust pipe 15 in communication with a vacuum pump (not shown). As shown in the figure, the heating furnace is placed in the atmosphere chamber 14 and the lower plug 1 is securely engaged at the bottom of the atmosphere chamber 14 to sealingly close the inside. Then, the inside of the process chamber 5 is replaced with a predetermined atmosphere by evacuating the inside through the exhaust pipe 15 or feeding an inert gas such as nitrogen, argon and helium from the conduit 12 to the inside while exhausting the gas from the inside. In case of evacuation, the inside of the process chamber 5 can also be replaced with the vacuum atmosphere through the through hole 10 by closing the valve 12. Further, by opening the valve 11 and feeding the atmosphere gas from the conduit 12, the inside of the process chamber 5 and the atmosphere chamber 14 are filled with the atmosphere gas which passes through the opening 13. Further, if the atmosphere gas is discharged from the gas exhaust pipe 15, since the atmosphere gas fed from the conduit 12 passes through the opening 13, the process chamber 5 and the through hole 10, enters into the gap between the atmosphere chamber 14 and the heating furnace and is then exhausted from the gas exhaust pipe 15, the molded products 17 can be exposed to a stream of the atmosphere gas under optionally set pressure. In any of the cases, it is desired to set the pressure inside of the atmosphere chamber 14 approximately below the atmospheric pressure so that no great amount of gases is absorbed into the molding products.

After conditioning the inside of the atmosphere chamber 14 to a predetermined atmosphere as stated above, preliminary sintering is applied to the molded products by supplying electrical current to the heating elements 2. It is required that the heating temperature be at such a level as to at least be sufficient to cause plastic flow in the constituent particles of the molded products. Since it is desired to increase the relative density of the sintered products at least to 90% in order to attain sufficient compaction by the subsequent HIP process, it is preferred to select the heating temperature and the heating time so as to attain such a relative density.

When the preliminary sintering has thus been completed, the vacuum atmosphere, for example, is replaced with an adequate inert gas. Thereafter, the lower plug 1 is detached from the atmosphere chamber 14 and the heating furnace incorporating the sintered products is removed from the atmosphere chamber 14 and directly placed into the high pressure chamber for the application of the HIP process. The steps of the process is to be explained more in detail referring to FIG. 3 which shows a schematic vertical cross section of the heating furnace as it is placed into the high pressure chamber.

Figure 3:
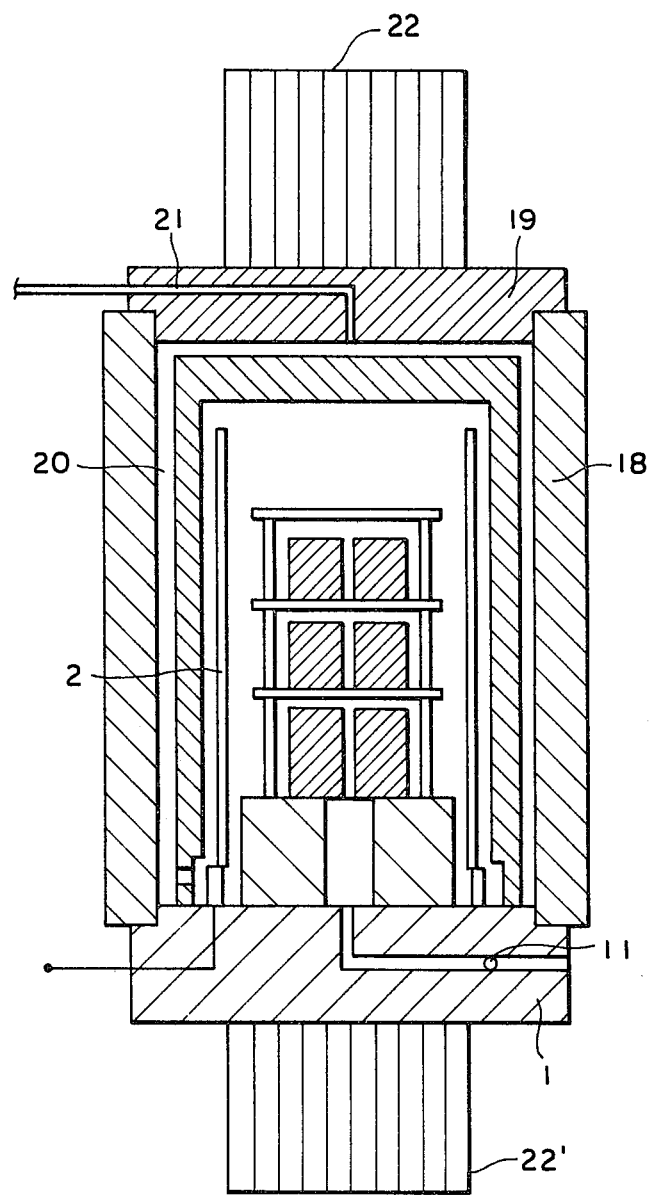

In FIG. 3, the high pressure chamber comprises a pressure-resistant cylinder 18 and an upper plug 19 hermetically closing the upper end thereof. By hermetically engaging the lower plug 1 with the lower end of the cylinder 18, a high pressure chamber 20 is formed inside the cylinder 18. The upper plug 19 is perforated with a conduit 21 for feeding and exhausting gas as a pressure medium. In this embodiment, the upper plug 19 and the lower plug 1 are held between press devices 22, 22' under pressure in order to avoid detachment during operation.

In the apparatus having the foregoing structure, the heating furnace is placed and arranged in the high pressure vessel by engaging the lower plug 1 carrying thereon the heating furnace whose interior is maintained at an elevated temperature at the lower end of the pressure-resistant cylinder 18 hermetically. The HIP process is applied while introducing the medium gas from the conduit 21 to the high pressure chamber 20 under pressure with the valve 11 being closed and supplying electrical current to the heating elements 2 to maintain heating thereby elevating the temperature inside the furnace. The pressurization is carried out by using, as the medium gas, an inert gas such as nitrogen, argon and helium at a high pressure at least about 500 atm. The temperature is adequately selected at a high enough level as required for causing plastic flow in the constituent material of the sintered products. By the HIP process, the sintered products are compacted into high density sintered products having a relative density near the theoretical density. After completion of the HIP process and after the pressure inside the furnace is returned to a normal pressure by the exhaustion of the gas medium from the conduit 21, the press devices 22, 22' are removed, the lower plug 1 is detached from the pressure-resistant cylinder 18, and the heating furnace and the high density sintered products loaded therein are integrally removed from the high pressure vessel. Successively, the heat insulating structure 3 is opened to remove the high density sintered products.

According to the first method of this invention as specifically described above, since the preliminary sintering is applied by the combined use of the movable heating furnace and the atmosphere chamber, followed by the HIP process by the combined use of the heating furnace and the high pressure vessel, the installation cost can be extremely reduced, the loss in the heat energy can be minimized, as well as the time of occupying the HIP apparatus being shortened to thereby significantly decrease the cycle time of the HIP process, as compared with the conventional method in which the expensive preliminary sintering furnace is used exclusively or both the preliminary sintering and the HIP process are carried out successively in one identical HIP apparatus. The invention as described above is further developed into a second embodiment for enabling a high density sintering method based on a more efficient HIP process using a skillful combination of a plurality of heating furnaces, one or more atmosphere chambers and a high pressure vessel and rationalizing the processing steps by a predetermined program, and the second invention with be explained referring to the drawings.

Figure 2:
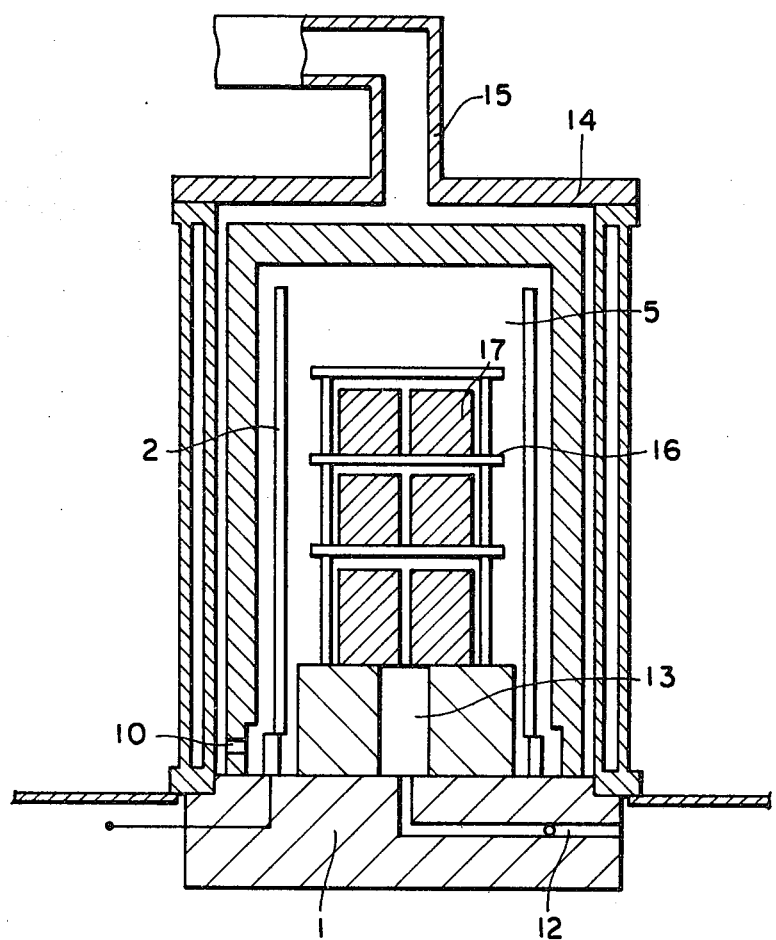
FIG. 2 and FIG. 3 are schematic vertical cross sectional views of the heating furnace shown in FIG. 1 as inserted in the atmosphere chamber and the high pressure vessel respectively.
Figure 4:
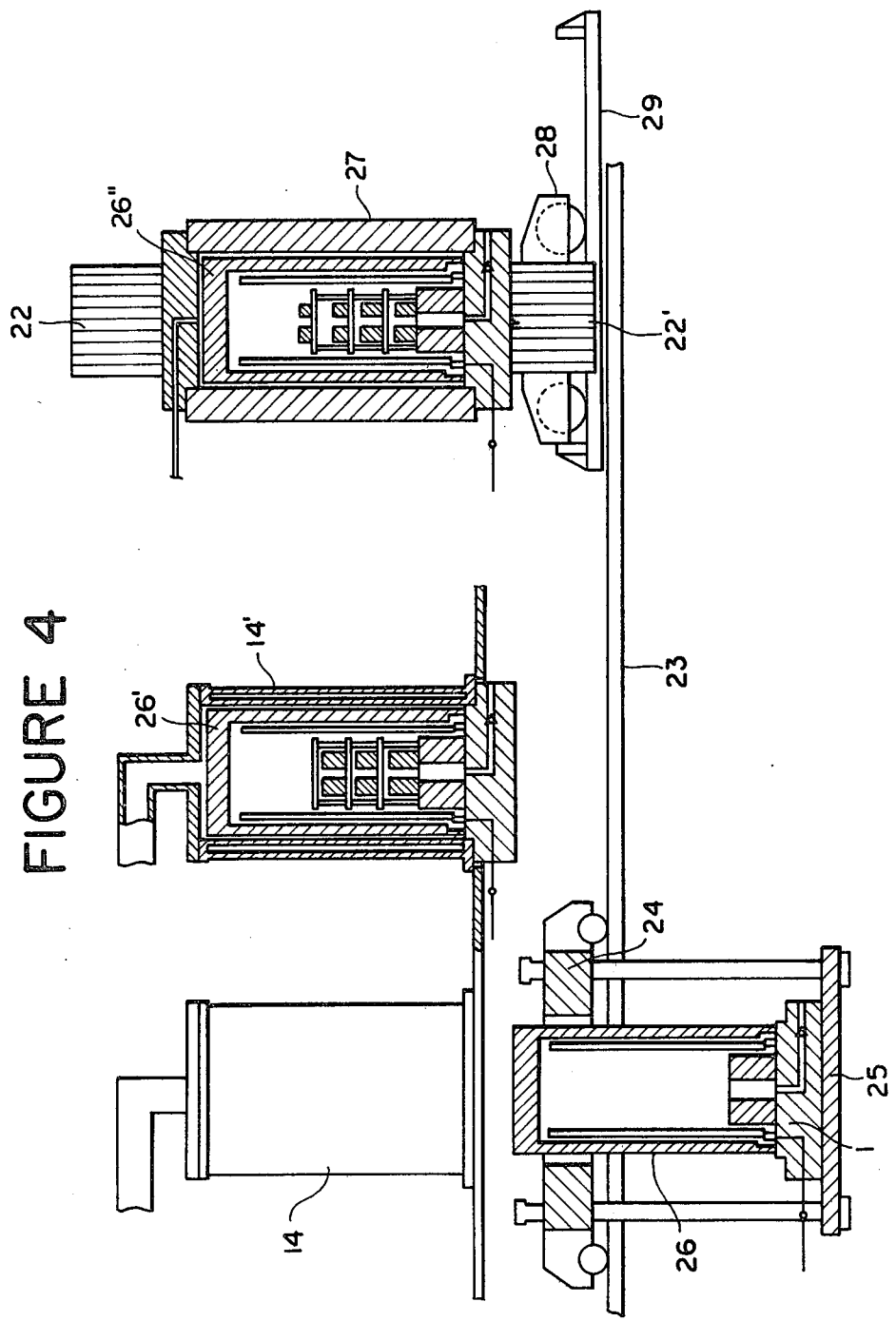
FIG. 4 is a schematic explanatory view of a second embodiment of the invention.

FIG. 4 is a schematic explanatory view of a second embodiment of this invention. In the figure, the heating furnace 26 such as shown in FIG. 1 is mounted on a support 25 suspended vertically movably from a carrier vehicle 24 that can run on a track 23. One or more atmosphere chambers 14, 14' and a high pressure chamber 27 are arranged in a row along and above the track 23. Each of the atmosphere chambers 14, 14' and the high pressure vessel 27 has the same structure as shown in FIG. 2 and FIG. 3 respectively. In this embodiment, there are provided three units of heating furnaces, that is, a first heating furnace 26 for preparation for the loading of molded products, a second heating furnace 26' placed in the atmosphere chamber 14' and a third heating furnace 26" placed in the high pressure vessel 27, two atmosphere chambers 14, 14' and one high pressure chamber 27. The press devices 22, 22', for holding the upper plug and the lower plug of the high pressure vessel 27, are capable of running on a track 29 and moving to a retracted position while being carried on a vehicle 28.

In the apparatus having the foregoing constitution, the first heating furnace 26, after being loaded with the molded products, by way of the procedures as mentioned above, is positioned just below the atmosphere chamber 14, then being elevated by the actuation of an elevator and inserted into the atmosphere chamber 14. Then, the lower plug 1 and the bottom of the atmosphere chamber 14 are hermetically engaged with each other. In this state, the inside of the furnace is conditioned to a predetermined atmosphere and the temperature is increased in accordance with the procedures mentioned previously and the preliminary sintering is carried out.

On the other hand, the HIP process has been completed in the high pressure vessel 27 and, at approximately the same time, the preliminary sintering has been completed in the second heating furnace 26' placed within the atmosphere chamber 14'. Then, the removal operation was carried out for each of the heating furnaces 26', 26" by using the carrier vehicle 24, in which the second heating furnace 26' is instantly introduced into the high pressure vessel 27 from which the third heating furnace 26" has been taken out, and the HIP process is started. In the third heating furnace 26", the high density sintered products are replaced with the molded products to be processed, which are introduced into the atmosphere chamber 14' and subjected to preliminary sintering.

On carrying out the above-noted successive steps, the HIP process can be efficiently carried out successively with a minimum interval by selecting various conditions such that the HIP processing time in the high pressure vessel is about $\frac{1}{2}$ of the time for preliminary sintering in the atmosphere chamber and properly setting the program for temperature elevation, loading and unloading, and transportation for each of the heating furnaces.

As specifically stated above, while there is a great loss in the heat energy in a conventional method wherein the preliminary sintering is applied using an exclusive furnace and, thereafter, the sintered products are cooled once and then transferred to the HIP apparatus for the subsequent HIP process, the method of this invention provides the merit of reducing the heat energy loss significantly since the preliminary sintering is applied in a movable heating furnace and the subsequent HIP process can be applied while maintaining the inside of the furnace at a high temperature state. In addition, although another conventional method of applying the preliminary sintering in the HIP apparatus while heating the molded products under a reduced pressure over a long time and pressurizing them under the medium gas requires an extremely long heating time period under the reduced pressure due to the structure of the HIP apparatus adapted to the heating under high pressure and occupies the expensive HIP apparatus for a long time, use of the movable heating furnace and the application of heating under reduced pressure in a separate atmosphere chamber in this invention can significantly shorten the occupying time, as well as the introduction of the heating furnace while in the heated state into the high pressure vessel followed by the direct starting of the pressurization step, coupled with elimination of the need for cooling the high pressure vessel each time after the HIP process, can reduce the cycle time for the HIP process to thereby provide a high density sintering method for powder molded products excellent in the working efficiency and productivity.

This invention is to be further explained by way of examples.

EXAMPLE 1

Vacuum sintering and an HIP process were applied to a cemented carbide item using the apparatus as shown in FIG. 4 and in accordance with the procedures as set forth below.

94 parts by weight of WC powder of $0.5\mu$ average particle size and 6 parts by weight of Co powder of $0.5\mu$ average particle size were wet-compounded in acetone as a solvent by using cemented carbide balls in a stainless steel pot for 4 days. Thereafter, paraffin was added and such were molded under a pressure of 1000 kgf/cm$^2$. After disposing the molded products thus obtained in the heating furnace 26 shown in FIG. 4, the heating furnace was inserted into the atmosphere chamber 14 and evacuated. Then, preliminary sintering was applied by supplying electrical current to the heating elements 2 and maintaining the temperature at 1300° C. for one hour. Thereafter, argon gas was injected to the atmosphere chamber 14 approximately at the atmospheric pressure. The heating furnace 26 was taken out from the atmosphere chamber 14 and transferred into the high pressure vessel 27 where argon gas was injected and the HIP process was applied under the condition of 1300° C. and 1000 kgf/cm$^2$ for one hour. After reducing the pressure, the heating furnace 26 was removed while keeping the inside of the furnace as it is at a high temperature.

The processing time in the atmosphere chamber was 7.5 hours while the time required for the HIP process was about 2.5 hours. The relative density of the sintered products was to be 96%, while the relative density of the WC-6 wt % Co cemented carbide as the high density sintered products after the HIP process was about 100% and the flexural strength was 210 kgf/mm$^2$.

EXAMPLE 2

The same steps are those in Example 1 were carried out by using 3 units of atmosphere chambers and 4 units of heating furnaces per one unit of high pressure vessel and applying the presintering step successively with a time lag of 2.5 hours to obtain high density sintering products of cemented carbide of high quality every 2.5 hours.

EXAMPLE 3

To 89 parts by weight of silicon nitride powder of $0.7\mu$ average particle size, 6 parts by weight of Y$_2$O$_3$, 2 parts by weight of Al$_2$O$_3$ and 3 parts by weight of MgO powder were added and they were wet-compounded in an aluminum ball mill using acetone as a solvent. After drying, they were molded using a hydrostatic press under the pressure of 1500 kgf/cm$^2$. The relative density of the molding products thus obtained was about 60%. The molding products were charged in a BN crucible and loaded in the heating furnace 26 shown in FIG. 4. The heating furnace 26 was inserted into the atmosphere chamber 14 and preliminarily sintered under the flow of nitrogen gas while supplying current power to the heating elements 2 to elevate the temperature up to 1000° C. and maintaining such temperature for 30 min. Then, the heating furnace was removed from the atmosphere chamber 14 and inserted into the high pressure vessel 27, wherein the nitrogen gas was injected to pressurize the vessel and, at the same time, the temperature was elevated to 1700° C. and maintained at such temperature for one hour. The pressure was decreased to the atmospheric pressure when the temperature in the inside of the process chamber 5 within the heating furnace 26 was lowered to 1200° C. and, thereafter, the heating furnace 26 was removed from the high pressure vessel 27. The time required for the HIP process was about 8.5 hours. The relative density for the sintered products was to be 92%, while the relative density for the high density sintered products thus obtained was about 100%.

Obviously numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A high density sintering method for powder molded products by applying preliminary sintering to powder molded products previously molded into a predetermined shape and then applying a hot isostatic press process to said sintered products thereby producing high density sintered products and utilizing a high pressure vessel, a movable heating furnace equipped with at least one heating means and having a heat insulating structure and an atmosphere chamber, which comprises:
    loading said powder molded products into said movable heating furnace;
    introducing said heating furnace into said atmosphere chamber;
    applying preliminary sintering to said powder molded products in said heating furnace by said at least one heating means while simultaneously conditioning the inside of said atmosphere chamber with a vacuum or predetermined gas atmosphere;
    subsequently removing said heating furnace from said atmosphere chamber while maintaining the inside of the furnace at a high temperature so that heat energy losses are minimized and directly introducing said furnace into said high pressure vessel;
    thereafter applying said hot isostatic press process to the sintered products in said furnace while charging a gas as a pressure medium under pressure into said high pressure vessel and elevating the temperature in said heating furnace by said at least one heating means to thereby produce high density sintered products; and
    removing said heating furnace together with the high density sintered products loaded therein from the high pressure vessel after completion of said hot isostatic pressure process.

2. The high density sintering method for powder molded products as defined in claim 1, wherein the powder molded products further comprise ceramic molded products.

3. The high density sintering method for powder molded products as defined in claim 2, wherein the ceramic molded products further comprise silicon nitride molded products, and the atmosphere for the preliminary sintering in the atmosphere chamber and the gas as the pressure medium in the high pressure vessel each further comprise nitrogen gas.

4. The high density sintering method for powder molded products as defined in claim 1, wherein the powder molded products further comprise metal powder molded products.

5. The high density sintering method for powder molded products as defined in claims 1, 2, 3 or 4, wherein the sintered products have a relative density of greater than 90%.

6. A high density sintering method for powder molded products by applying preliminary sintering to powder molded products previously molded into a predetermined shape and then applying a hot hydrostatic press process to said sintered products thereby producing high density sintered products, utilizing a plurality of movable heating furnaces each equipped with least one heating means and heating a heat insulating structure and at least one atmosphere chamber and a high pressure chamber, and which repeats the successive steps of loading said powder molded products into the first heating furnace, which comprises:
    introducing said heating furnace into the at least one atmosphere chamber;
    applying preliminary sintering to the powder molded products in said first heating furnace by said at least one heating means while conditioning the inside of said at least one atmosphere chamber to a vacuum or predetermined gas atmosphere;
    subsequently removing said heating furnace from said at least one atmosphere chamber while maintaining the inside of the furnace at a high temperature so that heat energy lossess are minimized and directly introducing said furnace into the high pressure vessel;
    thereafter applying said hot isostatic press process to said sintered products in said heating furnace while charging a gas as a pressure medium under pressure into said high pressure vessel and elevating the temperature in said heating furnace by said at least one heating means, while, on the other hand, introducing a second heating furnace loaded with said powder molded products into said at least one atmosphere chamber and applying the preliminary sintering to said powder molded products in the same manner as above in the course of said hot isostatic press process, and introducing the second heating furnace while maintaining the inside of the furnace at a high temperature so that heat energy losses are minimized into said high pressure vessel from which said first heating furnace has been removed after completion of said hot isostatic press process.

7. The high density sintering method for powder molded products as defined in claim 6, wherein the powder products further comprise ceramic products.

8. The high density sintering method for powder molded products as defined in claim 7, wherein the ceramic molded products further comprise silicon nitride molded products, and the atmosphere for the preliminary sintering in the atmosphere chamber and the gas as the pressure medium in the high pressure vessel each further comprise nitrogen gas.

9. The high density sintering method for powder molded products as defined in claim 6, wherein the powder molded products further comprise metal powder molded products.

10. The high density sintering method for powder molded products as defined in claims 6, 7, 8 or 9, wherein the sintered products have a relative density of greater than 90%.

* * * * *